Oct. 26, 1948.        J. P. JOHNSON        2,452,470
DISTRIBUTING DEVICE
Filed Jan. 17, 1946        2 Sheets-Sheet 1

INVENTOR.
JAMES P. JOHNSON
BY
Oberlin & Limbach
ATTORNEYS.

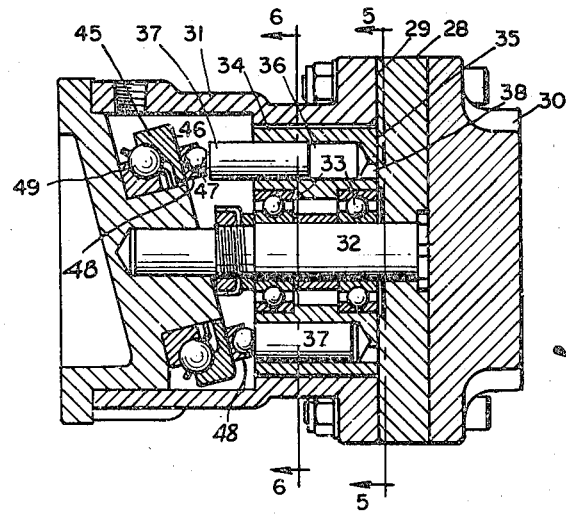
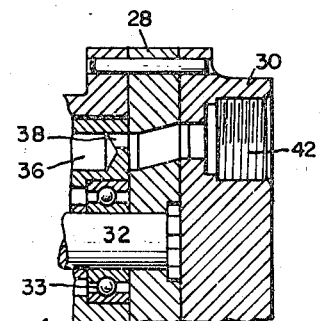
Fig. 4
Fig. 8
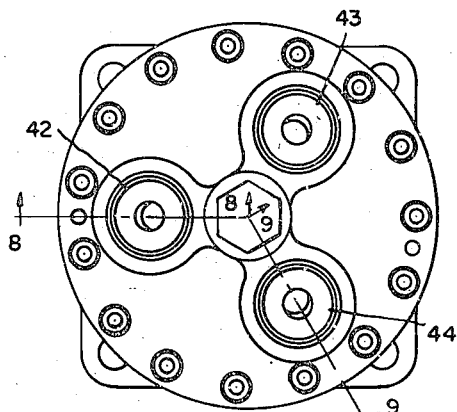
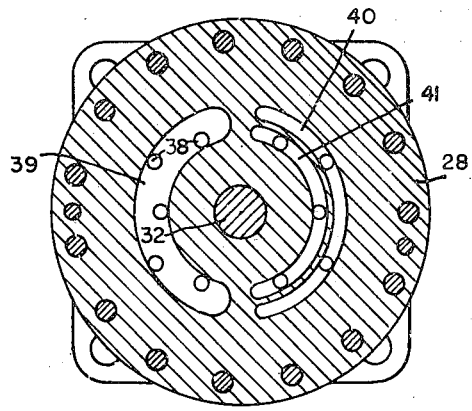
Fig. 7
Fig. 5
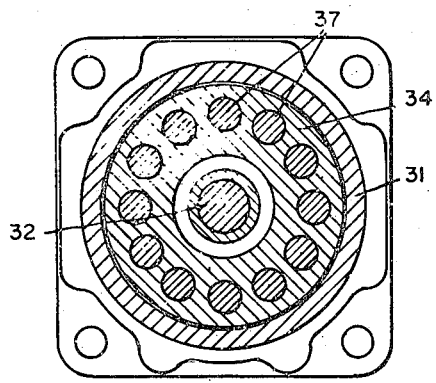
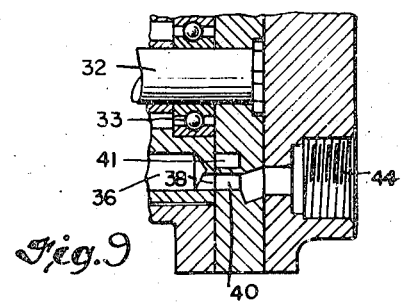
Fig. 6
Fig. 9
INVENTOR.
JAMES P. JOHNSON
BY
Oberlin & Limbach
ATTORNEYS Patented Oct. 26, 1948

2,452,470

UNITED STATES PATENT OFFICE 2,452,470

DISTRIBUTING DEVICE

James P. Johnson, Shaker Heights, Ohio

Application January 17, 1946, Serial No. 641,742

18 Claims. (Cl. 103—1)

This invention relates to a fluid distributing device and in one of its more detailed forms in commonly known as a "flow equalizer." In aircraft, fluid under pressure is used quite extensively to actuate certain component parts thereof such as the landing gear, wing flaps, trap doors, etc. Such component parts are generally actuated by means of individual actuating cylinders each being supplied with fluid under pressure from a common conduit. In the case of landing gear, for example, each strut is generally raised or lowered by means of a separate actuating cylinder associated with each strut. However because of cross winds, jamming of one strut, a greater resistance in one conduit leading thereto than in the other, such raising or lowering will not occur in unison as is desirable. With the hereinafter to be described distributing device installed in the conduits communicating with such actuating cylinders, it is possible to attain simultaneous actuation of such struts regardless of the aforesaid conditions which tend to impede such simultaneous actuation. While this device may have particular utility in aircraft, it can be used with equal facility in any fluid system where it is desired to maintain a fixed relation of movement between two or more elements thereof.

Therefore, it is an object of this invention to provide a device which is capable of dividing a stream of fluid into two or more branches, the rate of flow in each of which bears fixed relation to the flow in the others. Another object of this invention is to provide a device which will maintain said flow relationship regardless of pressure fluctuations in the branches.

Another object of this invention is to provide a device which can produce a booster effect in any of said branches which can exceed the pressure of the fluid in the original stream.

Still another object of this invention is to provide a device which is capable of reverse operation; that is to say that fluid under pressure in the branches can be united into a single stream, such single stream then comprising fixed proportions of the fluids in the branches.

Other objects of this invention are to provide a device which is simple in construction, efficient in operation and which is capable of accurately maintaining the ratio between the rates of flow in the branches.

Additional objects and advantages of this invention shall become apparent as the following description proceeds.

To the accomplishment of the foregoing and related ends said invention then comprises the features hereinafter fully described and particularly pointed out in the claims, the following description and the annexed drawings setting forth in detail certain illustrative embodiments of the invention, these being indicative however of but a few of the various ways in which the principle of the invention may be employed.

In the drawings:

Fig. 4 is a longitudinal cross sectional view through a modified form of this invention;

Fig. 5 is a cross sectional view taken along line 5—5 of Fig. 4;

Fig. 6 is a cross sectional view taken along line 6—6 of Fig. 4;

Fig. 7 is a plan view of the modified form as viewed from the right hand end of Fig. 4;

Fig. 8 is a cross sectional view taken along line 8—8 of Fig. 7; and

Fig. 9 is a cross sectional view taken along the line 9—9 of Fig. 7.

Figure 1:
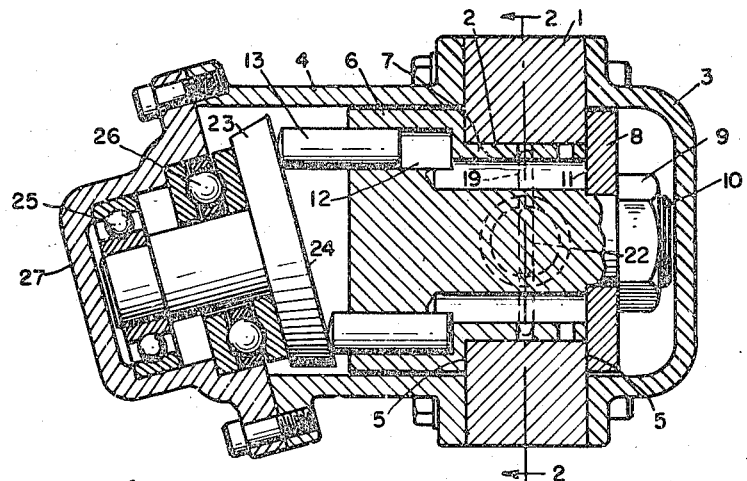
Fig. 1 is a longitudinal cross sectional view of one form of this invention.
Figure 2:
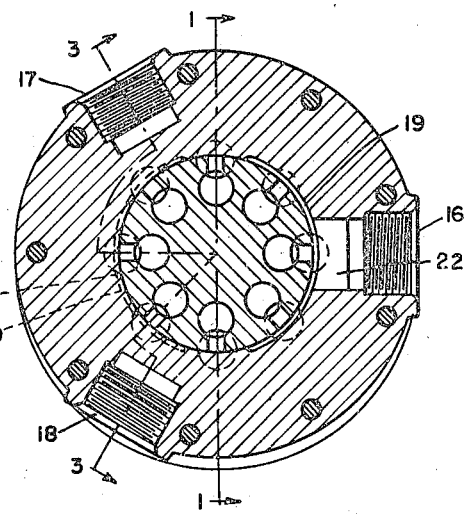
Fig. 2 is a cross sectional view taken along line 2—2 of Fig. 1.
Figure 3:
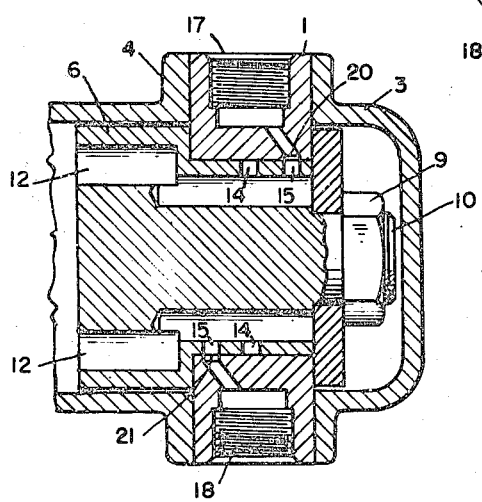
Fig. 3 is a cross sectional view of a portion of the form shown in Fig. 1 taken along line 3—3 of Fig. 2.

Now referring more particularly to the drawings, and first to the structure shown in Figs. 1-3, the device shown therein comprises a body portion 1 which is preferably cylindrical in form, having a cylindrical bore 2 therethrough. Secured on opposite ends of body portion 1 are a recessed cap member 3 and a hollow spacer member 4, respectively. The diameter of the recess in cap member 3 and the diameter of the bore through spacer member 4 are larger than bore 2 to provide a pair of radially inwardly extending shoulders 5.

Rotatably mounted within the body portion 1 is a rotor 6 having a reduced end portion 7 thereof closely fitted within bore 2 so as to provide a seal for oil or like fluid but yet providing sufficient clearance to permit free rotation thereof in said bore. Rotor 6 is held against longitudinal movement with respect to body portion 1 by portions thereof extending radially outwardly beyond the bore 2 adjacent the shoulders 5, one of said portions being an enlargement of the rotor and the other being a plate 8 secured to the inner end of the rotor as by a nut 9 threaded on to a reduced threaded end 10 of the rotor and said plate 8 being solidly clamped against a shoulder 11. The spacing between these shoulders is such that there is no binding effect to impede free rotation of the rotor 6 within body portion 1. The body portion 1 is preferably made of hardened steel and the rotor 6 is preferably made of bronze.

The rotor 6 at its outer enlarged end is provided with a plurality of cavities 12 in each of which is reciprocably mounted a piston 13 thereby forming an expansible chamber with the associated cavity 12. These cavities 12 are preferably disposed with their axes parallel to the axis of rotation of the rotor 6 and are preferably arranged in a circle about the axis of the rotor 6. Each of the cavities 12 terminates in two openings 14 and 15 at the periphery of the portion 7 of the rotor. As clearly shown in Fig. 3 all of the openings 14 are in alignment whereas the openings 15 are alternately offset longitudinally of the rotor 6.

Body portion 1 is provided with a plurality of ports 16, 17 and 18, each in communication with one of three annular passages 19, 20 and 21 formed in the wall of bore 2. Passage 19 extends substantially 180° about the bore 2 and is in communication with port 16 and is also in alignment with the openings 14 in the rotor 6. Passages 20 and 21 also extend substantially 180° about the bore 2 but are disposed diametrically opposite passage 19 and are spaced from one another so that each is in communication with only certain ones of the offset openings 15 in the rotor 6. As shown in Fig. 3, passage 20 is in communication with port 17 and passage 21 is in communication with port 18. Port 16 adjacent passage 19 is preferably of generally rectangular form as shown at 22 in Figs. 1 and 2.

Adjacent the outer end of rotor 6 is an abutment member 23 having a face 24 thereof inclined with respect to the axes of the pistons 13 and which face is adapted to be engaged by the outer ends of pistons 13. Abutment member 23 is mounted in a bearing 25 for rotation about an axis perpendicular to the inclined face 24 and is fixed longitudinally of said axis by a thrust bearing 26. Bearings 25 and 26 are housed within a cap member 27 secured to spacer member 4. Inclined face 24 is disposed so that points thereon closest and farthest from the rotor 6 correspond to the end extremities of passages 19, 20 and 21.

To further clarify the construction and operation of the above-described device, let us assume that fluid under pressure is entering port 16 and that ports 17 and 18 are each connected to identical units such as actuating cylinders which it is desirable to actuate in unison. Fluid under pressure then enters passage 19 and being in communication with 3 of the openings 14 in rotor 6, such fluid pressure will act against the inner ends of three of the pistons 13 tending to force them out of their respective cavities 12. In doing so, the outer ends of the three pistons will bear against the inclined face 24 and as a result, there will be produced resultant forces which will be effective to cause rotation of the rotor 6 in a counter-clockwise direction as viewed in Fig. 2. Rotation of the rotor 6 will then successively bring other openings 14 into communication with passage 19 at a time when the pistons associated therewith are at their innermost positions and will successively take those passages 14 out of communication with passage 19 whose pistons are at their outermost positions. Now as the rotor rotates the inclined face 24 will force those pistons which are out of communication with passage 19 inwardly. By reason of the offset relation of openings 15 in the rotor 6 and the communication of the openings 15 with either passage 20 or passage 21, the fluid displaced by the inward movement of said pistons will be discharged either through passage 20 and port 17 or through passage 21 and port 18. Thus, if the device is constructed with eight equal sized pistons as shown, all eight of which have an opening 14 associated therewith adapted to be successively brought into communication with passage 19 as the rotor rotates, and four of which have an opening 15 in communication with passage 20 and the other four have an opening 15 in communication with passage 21, it will be readily seen that in one full revolution of the rotor 6, eight pistons will have been forced outwardly and filled with fluid and four of the pistons will have discharged said fluid into passage 20 and four of the pistons will have discharged said fluid into passage 21. Thus, the volume of discharge from ports 17 and 18 will be equal. This relationship in the discharge volumes from ports 17 and 18 will remain fixed regardless of the effort required to actuate the units associated with each. In fact, a booster effect is attainable to transmit greater pressure to one of said discharge ports than is available at the inlet port 16. This can be best illustrated by way of example. When these devices are properly constructed, it is possible to attain efficiency on the order of 95–98%. Thus, with an inlet pressure of 1000 lbs. per square inch, for example, it is possible to transmit as much as 950–980 lbs. per square inch pressure to each of the units connected to ports 17 and 18. Now, if in the normal operation of the units connected to ports 17 and 18, 200 lbs. per square inch is required to operate each and one unit happens to be jammed or stuck, it is possible to transmit as much as 1800 lbs. per square inch less the loss due to friction or approximately 1700 lbs. per square inch to such jammed unit to break it loose.

While the device shown in Figs. 1–3 has eight pistons, any number of pistons could obviously be provided. Likewise, instead of providing two discharge passages of equal volume discharge, it is possible even with the eight piston arrangement to provide flow ratios of 1:7, 2:6 and 3:5 by merely altering the openings 15 so that more of them discharge into one of the passages 20 or 21 than into the other. Also with an arrangement such as produces a discharge volume ratio of 1:7, the maximum pressure which could be transmitted by said port discharging the ⅛ total volume could be as high as eight times that of the inlet pressure (less friction losses) if the other ⅞ volume were being discharged at zero or substantially zero pressure. Another obvious expedient is to provide more than two discharge ports having a fixed ratio between the rates of flow in each. Still another expedient is to reverse the device so that fluids under pressure are piped to ports 17 and 18 whereby the rotor 6 will rotate clockwise as viewed in Fig. 2 and in the particular embodiment shown in Figs. 1–3 fluid would issue from port 16 and such fluid would comprise equal volumes of the fluids entering ports 17 and 18. Also, instead of arranging the openings 15 so that they are alternately offset, it may be feasible in certain applications of this device to have four consecutive ones in alignment and the other four consecutive ones offset therefrom. Another expedient not shown in the drawings is to arrange the passages 20 and 21 in series so that each piston displaces the fluid therein into one passage during a portion of its inward movement and into the other passage during the remaining portion of its inward movement.

The modified form of this invention, as shown in Figs. 4-9, comprises a body portion 28 which is provided with a flat seating surface 29. A cap member 30 is secured to one side of body portion 28 and a hollow spacer member 31 is secured to the other side of the body portion 28. Projecting centrally from the body portion 28 into the spacer member 31 is a shaft 32 on which are bearings 33. Mounted on the bearings 33 is a rotor 34 which is adapted to rotate with respect to said body portion 28 and which has a seating face 35 in sealing contact with seating surface 29. The rotor 34 is provided with a plurality of cavities 36 in each of which is reciprocably mounted a piston 37 thereby forming an expansible chamber with the associated cavity 36. Each of the cavities 36 is preferably parallel to the axis of the rotor 34 and terminates at the seating face 35 in an opening 38, and as clearly shown in Fig. 5, one-half of the openings 38 are arranged in a circle of small diameter and the other one-half of the openings 38 are arranged in a circle of large diameter.

The seating surface 29 is provided with an arcuate passage 39 extending substantially 180° and which is of width spanning the openings 38 disposed at both the large and small diameters aforesaid. Diametrically opposed to passage 29 and also extending substantially 180° are two concentric arcuate passages 40 and 41. Passage 40 is of width spanning only those openings 38 disposed at the large diameter and passage 41 is of width spanning only those openings 38 disposed at the small diameter. Cap member 30 is provided with three ports 42, 43 and 44; port 42 being in communication with passage 39, port 43 being in communication with passage 41 and port 44 being in communication with passage 40.

Secured to the outer end of the spacer member 31 and adjacent the rotor 34 is an abutment member 45 having a face 46 inclined with respect to the axes of pistons 37. Inclined face 46 is engageable by the outer ends of pistons 37 in the same manner as described in connection with the form of invention shown in Figs. 1-3. The inclined face 46 bears the same relation to the passages in body portion 28 as does the inclined face in the form of Figs. 1-3 and further description is not thought necessary. The primary difference in the form shown in Figs. 4-9 is that the pistons 37 are provided with spherical ends 47 which engage in cups 48 to provide a swivel joint. Another difference is that in this form a single bearing 49 provides for rotation of abutment member 45 about a fixed axis and also prevents longitudinal movement thereof with respect to said axis.

The operation of this modified form is substantially the same as that shown in Figs. 1-3 and therefore the operation will only be briefly outlined. In this modified form, fluid under pressure enters port 42 and by means of passage 39 acts against the inner ends of the pistons 37 whose cavities 36 and openings 38 are in communication with passage 39. This effects rotation of the rotor. Thereupon the fluid contained within the cavities 36 whose openings 38 are in communication with passages 40 and 41, respectively, will be displaced from ports 43 and 44. This modified form is capable of use and modification in the various ways described in connection with the form of Figs. 1-3 and therefore need not now be repeated.

It is further contemplated that both forms of this invention can be further modified by connecting the pistons to the abutment member and effecting rotation of the abutment member by external power means and rotating the abutment member about an axis parallel to the axes of the pistons. In this manner fluid can be drawn in from ports 16 or 42 and distributed under pressure to the other ports or vice versa.

Other modes of applying the principle of the invention may be employed, change being made as regards the details described, provided the features stated in any of the following claims or the equivalent of such be employed.

I therefore particularly point out and distinctly claim as my invention:

1. In a device of the character described, a body, a rotor rotatably mounted therein, a plurality of pistons reciprocably mounted in bores in said rotor, an abutment in said body having a face thereof inclined with respect to the axes of said pistons and adapted to be engaged by the outer ends of said pistons, inlet passage means for directing fluid under pressure against the inner ends of those pistons which are disposed on one side of an axial plane passed through points on said abutment closest and farthest from said rotor whereby the pistons so disposed are forced outwardly into engagement with said abutment to set up force components effective to rotate said rotor, and a plurality of discharge passage means each communicable with the inner ends of only certain of those pistons which are disposed on the opposite side of said plane whereby rotation of said rotor as aforesaid will effect movement of said pistons inwardly and consequent displacement of fluid therefrom into predetermined discharge passage means.

2. In a device of the character described, a body, a rotor rotatably mounted therein, a plurality of pistons reciprocably mounted in bores in said rotor, an abutment in said body having a face thereof inclined with respect to the axes of said pistons and adapted to be engaged by the outer ends of said pistons, inlet passage means for directing fluid under pressure against the inner ends of those pistons which are disposed on one side of an axial plane passed through points on said abutment closest and farthest from said rotor whereby the pistons so disposed are forced outwardly into engagement with said abutment to set up force components effective to rotate said rotor, and a plurality of discharge passage means each communicable with the inner ends of only certain of those pistons which are disposed on the opposite side of said plane whereby rotation of said rotor as aforesaid will effect movement of said pistons inwardly and consequent displacement of fluid therefrom into predetermined discharge passage means, said abutment being rotatable about an axis perpendicular to the face thereof.

3. In a device of the character described, a body, a rotor rotatably mounted therein, a plurality of pistons reciprocably mounted in bores in said rotor, an abutment in said body having a face thereof inclined with respect to the axes of said pistons and adapted to be engaged by the outer ends of said pistons, inlet passage means for directing fluid under pressure against the inner ends of those pistons which are disposed on one side of an axial plane passed through points on said abutment closest and farthest from said rotor whereby the pistons so disposed are forced outwardly into engagement with said abutment to set up force components effective to rotate said rotor, and a plurality of discharge passage means each communicable with the inner ends of only certain of those pistons which are disposed on the opposite side of said plane whereby rotation of said rotor as aforesaid will effect movement of said pistons inwardly and consequent displacement of fluid therefrom into predetermined discharge passage means, said abutment being rotatable about an axis perpendicular to the face thereof and being fixed in a direction longitudinal of said axis.

4. In a device of the character described, a body, a rotor rotatably mounted therein, a plurality of pistons reciprocably mounted in bores in said rotor, an abutment in said body having a face thereof inclined with respect to the axes of said pistons and adapted to be engaged by the outer ends of said pistons, inlet passage means for directing fluid under pressure against the inner ends of those pistons which are disposed on one side of an axial plane passed through points on said abutment closest and farthest from said rotor whereby the pistons so disposed are forced outwardly into engagement with said abutment to set up force components effective to rotate said rotor, a plurality of discharge passage means each communicable with the inner ends of only certain of those pistons which are disposed on the opposite side of said plane whereby rotation of said rotor as aforesaid will effect movement of said pistons inwardly and consequent displacement of fluid therefrom into predetermined discharge passage means, said inlet passage means including an annular passage in said body encircling a portion of the periphery of said rotor and separate passages in the periphery of said rotor in communication with said annular passage.

5. In a device of the character described, a body, a rotor rotatably mounted therein, a plurality of pistons reciprocably mounted in bores in said rotor, an abutment in said body having a face thereof inclined with respect to the axes of said pistons and adapted to be engaged by the outer ends of said pistons, inlet passage means for directing fluid under pressure against the inner ends of those pistons which are disposed on one side of an axial plane passed through points on said abutment closest and farthest from said rotor whereby the pistons so disposed are forced outwardly into engagement with said abutment to set up force components effective to rotate said rotor, and a plurality of discharge passage means each communicable with the inner ends of only certain of those pistons which are disposed on the opposite side of said plane whereby rotation of said rotor as aforesaid will effect movement of said pistons inwardly and consequent displacement of fluid therefrom into predetermined discharge passage means, said discharge passage means including at least two disconnected annular passages in said body encircling a portion of the periphery of said rotor and separate passages in the periphery of said rotor in communication with one or the other of said annular passages.

6. In a device of the character described, a body, a rotor rotatably mounted therein, a plurality of pistons reciprocably mounted in bores in said rotor, an abutment in said body having a face thereof inclined with respect to the axes of said pistons and adapted to be engaged by the outer ends of said pistons, inlet passage means for directing fluid under pressure against the inner ends of those pistons which are disposed on one side of an axial plane passed through points on said abutment closest and farthest from said rotor whereby the pistons so disposed are forced outwardly into engagement with said abutment to set up force components effective to rotate said rotor, a plurality of discharge passage means each communicable with the inner ends of only certain of those pistons which are disposed on the opposite side of said plane whereby rotation of said rotor as aforesaid will effect movement of said pistons inwardly and consequent displacement of fluid therefrom into predetermined discharge passage means, said inlet passage means including an annular passage in said body encircling a portion of the periphery of said rotor and separate passages in the periphery of said rotor in communication with said annular passage and said discharge passage means including at least two other disconnected annular passages in such body encircling a portion of the periphery of said rotor other than that encircled by said first-named annular passage and separate passages in the periphery of said rotor in communication with one or the other of said last-named annular passages.

7. In a device of the character described, a body having a cylindrical bore therein, a rotor rotatably mounted in said bore in sealing contact therewith and fixed longitudinally thereof, a plurality of pistons reciprocably mounted in bores in said rotor with their axes parallel to the axis of said bore, an abutment in said body having a face thereof inclined with respect to the axes of said pistons and adapted to be forcibly engaged by the outer ends of said pistons to effect rotation of said rotor, separate passages in said rotor in communication with the inner ends of said pistons and terminating at the periphery of said rotor in two longitudinally spaced openings for each piston, at least three separate openings in said body bore, two of which are discharge openings longitudinally spaced from each other but coextensive about said bore and the other of which is an inlet opening diametrically opposed to said discharge openings, said openings in said rotor and in said body being arranged to afford communication successively between said inlet opening in said body bore and one of the two longitudinally spaced openings in said rotor and between the other of said longitudinally spaced openings in said rotor and only one or the other of said discharge openings in said body as said rotor rotates.

8. In a device of the character described, a body with a bore therethrough and having an inlet passage and at least two discharge passages spaced peripherally thereabout and extending radially therethrough into said bore, a rotor rotatably mounted in said bore and fixed longitudinally thereof, fluid pressure responsive means associated with said rotor and body for effecting rotation of said rotor, passages in said rotor affording communication between said fluid pressure responsive means and said body passages, said rotor including a portion of diameter larger than said body bore overlying one side of said body and a plate fixed longitudinally of said rotor of diameter larger than said body bore overlying the other side of said body.

9. In a device of the character described, a casing having a flat seating face and an arcuate inlet passage therein and at least two concentric arcuate discharge passages diametrically opposed to said inlet passage, a rotor rotatably mounted in said body and having a face engageable in sealing contact with said flat seating face and overlying said arcuate passages, a plurality of pistons reciprocably carried by said rotor in bores perpendicular to said flat seating face, an abutment in said body having a face thereof inclined with respect to said flat seating face and adapted to be contacted with by the outer ends of said pistons, passages in said rotor affording communication between said arcuate passages and the inner ends of said pistons, said inclined plate, arcuate passages and rotor passages being arranged so that fluid pressure entering said inlet passage will move the pistons in communication therewith outwardly to effect rotation of said rotor and such rotation will, in turn, move certain pistons inwardly to discharge the fluid displaced thereby into one or the other of said arcuate discharge passages.

10. In a device of the character described, a body, a rotor rotatably mounted therein, a plurality of pistons reciprocably mounted in bores in said rotor, an abutment in said body having a face thereof inclined with respect to the axes of said pistons and adapted to be engaged by the outer ends of said pistons, inlet passage means for directing fluid under pressure against the inner ends of those pistons which are disposed on one side of an axial plane passed through points on said abutment closest and farthest from said rotor whereby the pistons so disposed are forced outwardly into engagement with said abutment to set up force components effective to rotate said rotor, and a plurality of discharge passage means each communicable with the inner ends of only certain of those pistons which are disposed on the opposite side of said plane whereby rotation of said rotor as aforesaid will effect movement of said pistons inwardly and consequent displacement of fluid therefrom into predetermined discharge passage means, said inlet passage means including an arcuate passage in said casing and separate passages in said rotor in communication with said arcuate passage.

11. In a device of the character described, a body, a rotor rotatably mounted therein, a plurality of pistons reciprocably mounted in bores in said rotor, an abutment in said body having a face thereof inclined with respect to the axes of said pistons and adapted to be engaged by the outer ends of said pistons, inlet passage means for directing fluid under pressure against the inner ends of those pistons which are disposed on one side of an axial plane passed through points on said abutment closest and farthest from said rotor whereby the pistons so disposed are forced outwardly into engagement with said abutment to set up force components effective to rotate said rotor, a plurality of discharge passage means each communicable with the inner ends of only certain of those pistons which are disposed on the opposite side of said plane whereby rotation of said rotor as aforesaid will effect movement of said pistons inwardly and consequent displacement of fluid therefrom into predetermined discharge passage means, said discharge passage means including at least two disconnected concentric arcuate passages in said body and separate passages in said rotor in communication with one or the other of said concentric arcuate passages.

12. In a device of the character described, a body, a rotor rotatably mounted therein, a plurality of pistons reciprocably mounted in bores in said rotor, an abutment in said body having a face thereof inclined with respect to the axes of said pistons and adapted to be engaged by the outer ends of said pistons, inlet passage means for directing fluid under pressure against the inner ends of those pistons which are disposed on one side of an axial plane passed through points on said abutment closest and farthest from said rotor whereby the pistons so disposed are forced outwardly into engagement with said abutment to set up force components effective to rotate said rotor, a plurality of discharge passage means each communicable with the inner ends of only certain of those pistons which are disposed on the opposite side of said plane whereby rotation of said rotor as aforesaid will effect movement of said pistons inwardly and consequent displacement of fluid therefrom into predetermined discharge passage means, said inlet passage means including an arcuate passage in said body and separate passages in said rotor in communication with said arcuate passage, and said discharge passage means including at least two other disconnected concentric arcuate passages disposed diametrically opposite said first-named arcuate passage and separate passages in said rotor in communication with one or the other of said last-named arcuate passages.

13. In a device of the character described, the combination of a body portion formed with a fluid pressure inlet passage and a plurality of discharge passages, a single rotor rotatably mounted in said body portion formed with a plurality of cavities each of which successively communicates with such inlet passage and a preselected one of such discharge passages during rotation of said rotor, a piston in each of such cavities moved in one direction therein by fluid under pressure when the cavity associated therewith is in communication with such inlet passage, means engaged by said pistons converting such piston movement into rotation of said rotor, said means being so formed that said pistons are forced in an opposite direction during rotation of said rotor when the cavities associated therewith are in communication with their respective preselected discharge passages.

14. In a device of the character described, the combination of a body portion formed with a fluid pressure inlet passage and a plurality of discharge passages, a single rotor rotatably mounted in said body portion formed with a plurality of expansible chambers each of which successively communicates with such inlet passage and a preselected one of such discharge passages during rotation of said rotor, such chambers being expanded by fluid under pressure admitted thereinto from such inlet passage, means responsive to expansion of such chambers for effecting rotation of said rotor, said means being so formed that during rotation of said rotor such expanded chambers are contracted when in communication with such discharge passages.

15. In a device of the character described, the combination of a body portion formed with a bore having an annular fluid pressure inlet passage and a plurality of annular discharge passages in the wall thereof, such discharge passages being axially spaced from one another and circumferentially spaced from such inlet passage, a single rotor rotatably mounted in said body portion with an outer surface thereof having a close running fit with the wall of such body portion bore and formed with a plurality of expansible chambers leading to such rotor surface each of which chambers successively communicates with such inlet passage and a preselected one of such discharge passages during rotation of said rotor, such chambers being expanded by fluid under pressure admitted thereinto from such inlet passage, means responsive to expansion of such chambers for effecting rotation of said rotor, said means being so formed that during rotation of said rotor such expanded chambers are contracted when in communication with such discharge passages.

16. In a device of the character described, the combination of a body portion formed with a bore terminating in an end wall provided with an arcuate fluid pressure inlet passage and a plurality of concentric arcuate discharge passages circumferentially spaced from such inlet passage, a single rotor rotatably mounted in said body portion with an end thereof engaging such end wall and formed with a plurality of expansible chambers leading to such rotor end each of which chambers successively communicates with such inlet passage and a preselected one of such discharge passages during rotation of said rotor, such chambers being expanded by fluid under pressure admitted thereinto from such inlet passage, means responsive to expansion of such chambers for effecting rotation of said rotor, said means being so formed that during rotation of said rotor such expanded chambers are contracted when in communication with such discharge passages.

17. In a device of the character described, the combination of a body portion formed with a bore having an annular fluid pressure inlet passage and a plurality of annular discharge passages in the wall thereof, such discharge passages being axially spaced from one another and circumferentially spaced from such inlet passage, a single rotor rotatably mounted in said body portion with an outer surface thereof having a close running fit with the wall of such body portion bore and formed with a plurality of expansible cavities leading to such rotor surface each of which cavities successively communicates with such inlet passage and a preselected one of such discharge passages during rotation of said rotor, a piston in each of such cavities moved in one direction therein by fluid under pressure when the cavity associated therewith is in communication with such inlet passage, means engaged by said pistons converting such piston movement into rotation of said rotor, said means being so formed that said pistons are forced in an opposite direction during rotation of said rotor when the cavities associated therewith are in communication with their respective preselected discharge passages.

18. In a device of the character described, the combination of a body portion formed with a bore terminating in an end wall provided with an arcuate fluid pressure inlet passage and a plurality of concentric arcuate discharge passages circumferentially spaced from such inlet passages, a single rotor rotatably mounted in said body portion with an end thereof engaging such end wall and formed with a plurality of expansible cavities leading to such rotor end each of which cavities successively communicates with such inlet passage and a preselected one of such discharge passages during rotation of said rotor, a piston in each of such cavities moved in one direction therein by fluid under pressure when the cavity associated therewith is in communication with such inlet passage, means engaged by said pistons converting such piston movement into rotation of said rotor, said means being so formed that said pistons are forced in an opposite direction during rotation of said rotor when the cavities associated therewith are in communication with their respective preselected discharge passages.

JAMES P. JOHNSON.

REFERENCES CITED

The following references are of record in the file of this patent:

UNITED STATES PATENTS

| Number | Name | Date |
| --- | --- | --- |
| 1,933,081 | Stephen | Oct. 31, 1933 |
| 2,193,612 | Alden | Mar. 12, 1940 |
| 2,353,802 | Zimmermann | July 18, 1944 |